United States Patent [19]

Watanabe

[11] Patent Number: 5,499,101
[45] Date of Patent: Mar. 12, 1996

[54] IMAGE FORMING APPARATUS WHICH AVOIDS COPYING INSIGNIFICANT INFORMATION

[75] Inventor: Yoshio Watanabe, Hiratsuka, Japan

[73] Assignee: Kabushiki Kaisha Toshiba, Kawasaki, Japan

[21] Appl. No.: 22,088

[22] Filed: Feb. 25, 1993

[30] Foreign Application Priority Data

Mar. 4, 1992 [JP] Japan ................................ 4-047220

[51] Int. Cl.⁶ ........................... H04N 1/387; H04N 1/38; G03G 21/00; G06K 9/00
[52] U.S. Cl. .................... 358/296; 358/406; 358/464; 355/206; 382/308; 382/319
[58] Field of Search ................................ 358/296, 298, 358/406, 443, 455–457, 464–466, 474, 486, 504, 505; 355/204–206, 209, 308, 311, 313, 314, 319, 320; 382/41, 50, 58, 63, 65, 270, 276, 308, 312, 319, 321

[56] References Cited

U.S. PATENT DOCUMENTS

| | | | |
|---|---|---|---|
| 4,682,158 | 7/1987 | Ito et al. | 355/14 C |
| 4,831,458 | 5/1989 | Watanabe | 358/280 |
| 4,839,740 | 6/1989 | Yoshida | 358/288 |
| 5,138,674 | 8/1992 | Sugawa | 382/58 |
| 5,268,773 | 12/1993 | Park et al. | 358/464 X |
| 5,270,838 | 12/1993 | Mita | 358/406 |

FOREIGN PATENT DOCUMENTS 4-199161 7/1992 Japan ........................... G03G 15/00

OTHER PUBLICATIONS

Patent Abstracts of Japan, vol. 13, No. 366 (E–806), 15 Aug. 1989, and JP–A–11 23 567, published May 16, 1989.
Yeskel, "Digital Image Processing Algorithm for High Frequency Information", IBM Technical Disclosure Bulletin, vol. 27, No. 7B, Dec. 1984, pp. 4288–4299.

*Primary Examiner*—Peter S. Wong
*Assistant Examiner*—Eric Frahm
*Attorney, Agent, or Firm*—Foley & Lardner

[57] ABSTRACT

An image forming apparatus includes an image memory section in an image processing section for temporarily storing an image signal read from an optical system via a photoelectric transducer section, an arithmetic section for numerical computation based on data stored in the image memory section, a decision section adapted to conclude that an image forming operation should be interrupted when a variation rate E of the image signal is lower than a threshold value T read from a ROM as a result of computation by the arithmetic section, and to conclude that the image forming operation should be continued when the variation rate E is equal to or higher than the threshold value T. A section is also provided for interrupting the image forming operation in response to a command from the decision section when there is no operator's key entry to order the interruption or execution of the image forming operation within a predetermined period of time.

8 Claims, 6 Drawing Sheets

| P2 | P3 | P4 |
|----|----|----|
| P5 | P1 | P6 |
| P7 | P8 | P9 |

IMAGE FORMING APPARATUS WHICH AVOIDS COPYING INSIGNIFICANT INFORMATION

BACKGROUND OF THE INVENTION

1. Field of the Invention

The present invention relates to an image forming apparatus such as a digital copying machine.

2. Description of the Related Art

A digital copying machine is disclosed in U.S. Pat. No. 4,831,458. In this conventional digital copying machine, image data read from original documents never fails to be formed as images on copying sheets without regard to the amount of image information from the documents.

According to the conventional digital copying machine, however, all the read image data are formed as images without exception, so that even a stray blank sheet of paper or the blank wrong side of a reversed original document, if any, cannot avoid being copied.

A copy resulting from this useless document image formation is bound to be rejected as a miscopy, after all. Conventionally, therefore, such an awkward situation has been expected to be removed.

SUMMARY OF THE INVENTION

The present invention has been contrived in order to solve the above problem, and its object is to provide an image forming apparatus which can avoid copying insignificant information from a useless document or paper, such as a blank sheet of paper or the blank reverse side of an original document, if any.

According to an aspect of the present invention, there is provided an image forming apparatus which comprises: a light source for illuminating an original document; an optical system for focusing a reflected light beam from the original document; a photoelectric transducer section for converting an optical image formed by means of the optical system into an electrical signal; an A/D converter section for A/D-converting an image signal photoelectrically converted by means of the photoelectric transducer section; an image processing section for processing the image signal A/D-converted by means of the A/D converter section; a printing section for forming an image on an image forming medium on the basis of the image signal processed by means of the image processing section; a control section for controlling the individual sections; arithmetic means for computing the changing rate of the image signal read from the optical system via the photoelectric transducer section; an image memory circuit in the image processing section for temporarily storing the image signal read from the optical system via the photoelectric transducer section; a numerical arithmetic circuit for numerical computation based on the data stored in the image memory circuit; a decision circuit adapted to conclude that image forming operation should be interrupted when the changing rate of the image signal is lower than a predetermined threshold value as a result of computation by means of the numerical arithmetic circuit, and to conclude that the image forming operation should be continued when the changing rate of the image signal is equal to or higher than the predetermined threshold value; and means for instructing the image processing section to interrupt the image forming operation when it is concluded by the decision circuit that the image forming operation should be interrupted.

The image forming apparatus further comprises a display section and a key entry section, and means for interrupting the image forming operation in response to a command from the decision circuit when there is no operator's key entry to order the interruption or execution of the image forming operation within a predetermined period of time.

The image data is read, the image changing rate is computed on the basis of the image data, and the propriety of the image formation is judged by the changing rate. If it is concluded that the image forming operation should be interrupted, an indication for the interruption of the image forming operation is displayed on the display section, and the image formation is executed or interrupted by the operator's key entry in accordance with an instruction for the interruption or execution of the image forming operation.

Thus, the propriety of copying is judged by the amount of information from the original document, and the operator is urged to reconfirm the necessity of copying, so that useless document image formation can be prevented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Embodiments of the present invention will now be described in detail with reference to the accompanying drawings.

Figure 1:
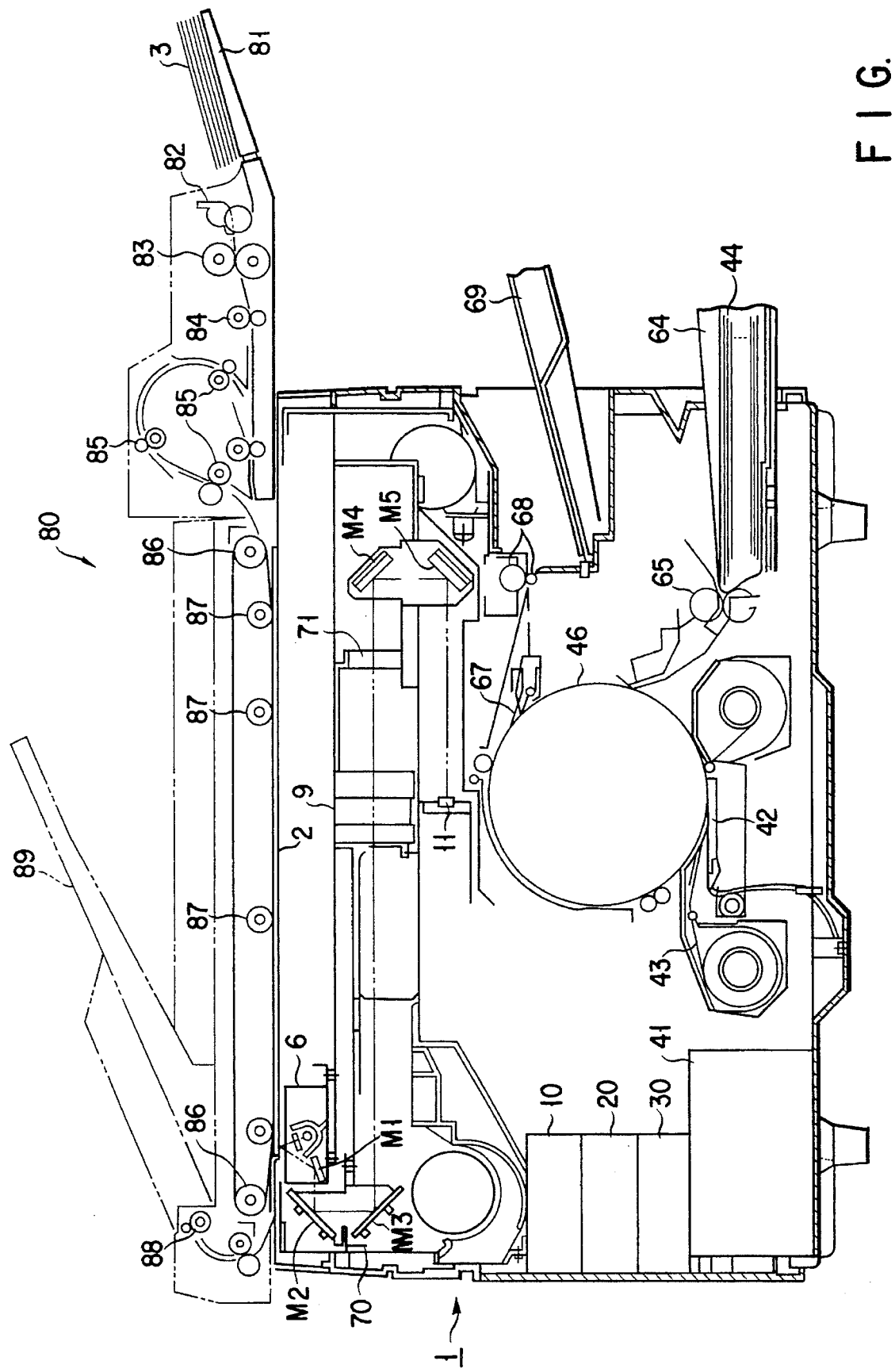
FIG. 1 is a vertical sectional view showing an outline of a digital copying machine with an ADF function.

As shown in FIG. 1, an ADF 80 is provided on the top portion of a color digital copying machine 1 of the heat-transfer type. The ADF 80, which is opposed to a document glass 2, is designed so that original documents 3 can be fed one after another from a document supply tray 81 to a document receiving tray 89 via rollers 82, 83, 84, 85, 86, 87 and 88. A scanner 6 of an image information reader, which is located right under the glass 2, serves to illuminate the original documents 3 and optically read image information.

A platen drum 46 is disposed in the housing of the digital copying machine 1. An ink ribbon 43 is pressed against the peripheral surface of the drum 46 by means of a thermal printer head 42. The head 42 is connected to a power source 41, which has a current regulating function.

A paper cassette 64 is attached to the lower part of a side face of the digital copying machine 1. Paper sheets 44 are fed from the cassette 64 to the platen drum 46 by means of a pickup roller (not shown) and a pair of rollers 65. Each paper sheet 44 is separated from the peripheral surface of the drum 46 by means of a scraper 67. After copying, each sheet 44 is discharged onto a receiving tray 69 by means of exit rollers 68.

Figure 2:
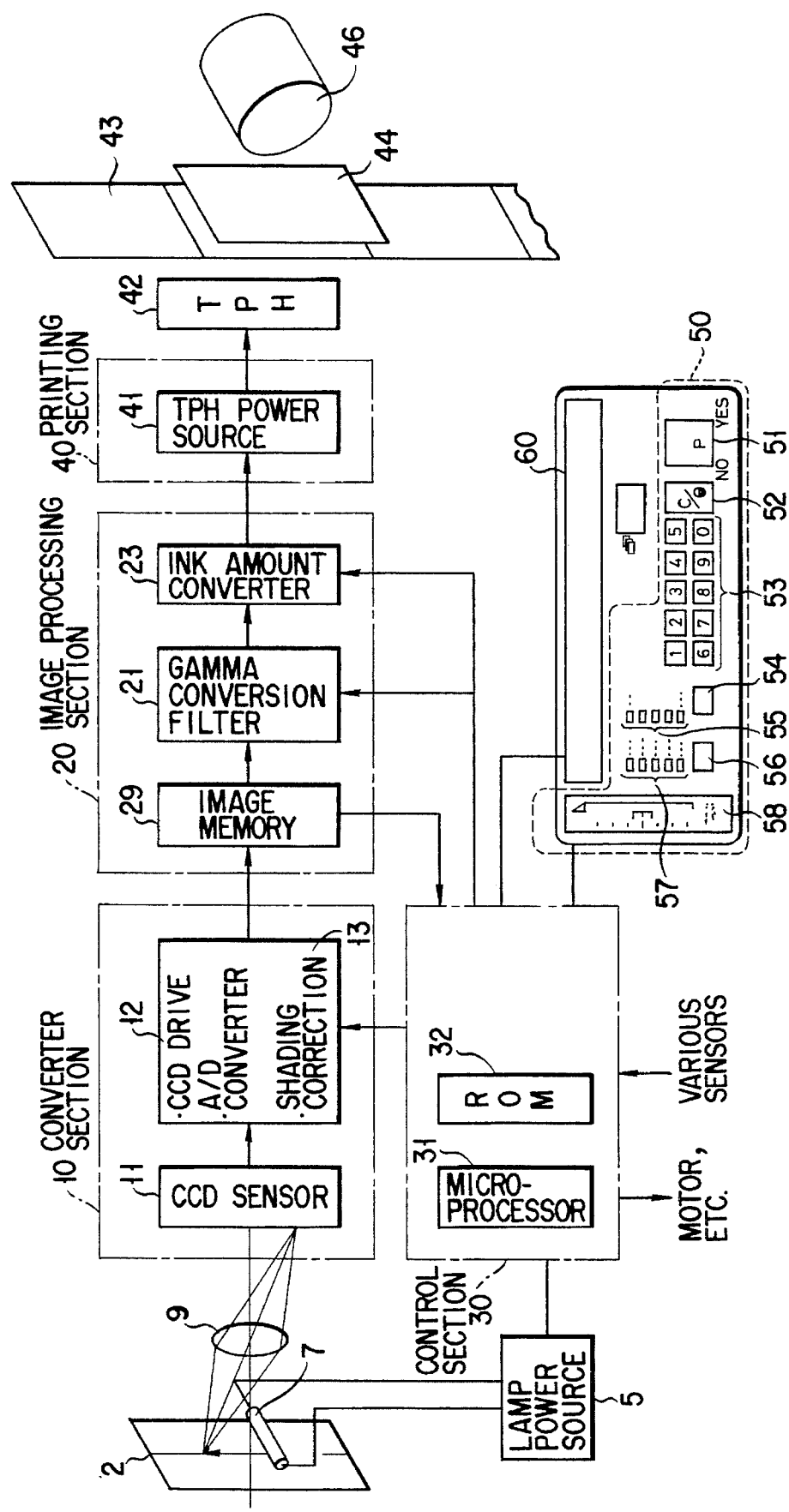
FIG. 2 is a block diagram showing an image processing mechanism of the digital copying machine according to an embodiment of the present invention.

Referring now to FIG. 2, an outline of a circuit of the digital copying machine 1 will be described. An exposure lamp 7 is provided for movement along the document glass 2 of the copying machine. A power source 5 for the lamp 7 is connected to a control section 30, whereby the exposure can be adjusted. A lens 9 is arranged so as to focus an illuminated or exposed document image on a CCD sensor 11 of a converter section 10. The sensor 11 is connected to an A/D converter 12 and a shading correction circuit 13 in the converter section 10.

The A/D converter 12 and the shading correction circuit 13 are connected to an image memory 29 of an image processing section 20. The memory 29 is connected to a microprocessor 31 of the control section 30. A ROM 32 is loaded with software including the computational procedure, criteria of judgment, judgment procedure, etc. Whether image formation should be executed is determined on the basis of set data invoked from the ROM 32 by means of the microprocessor 31 and image data from the image memory 29.

Figure 4:
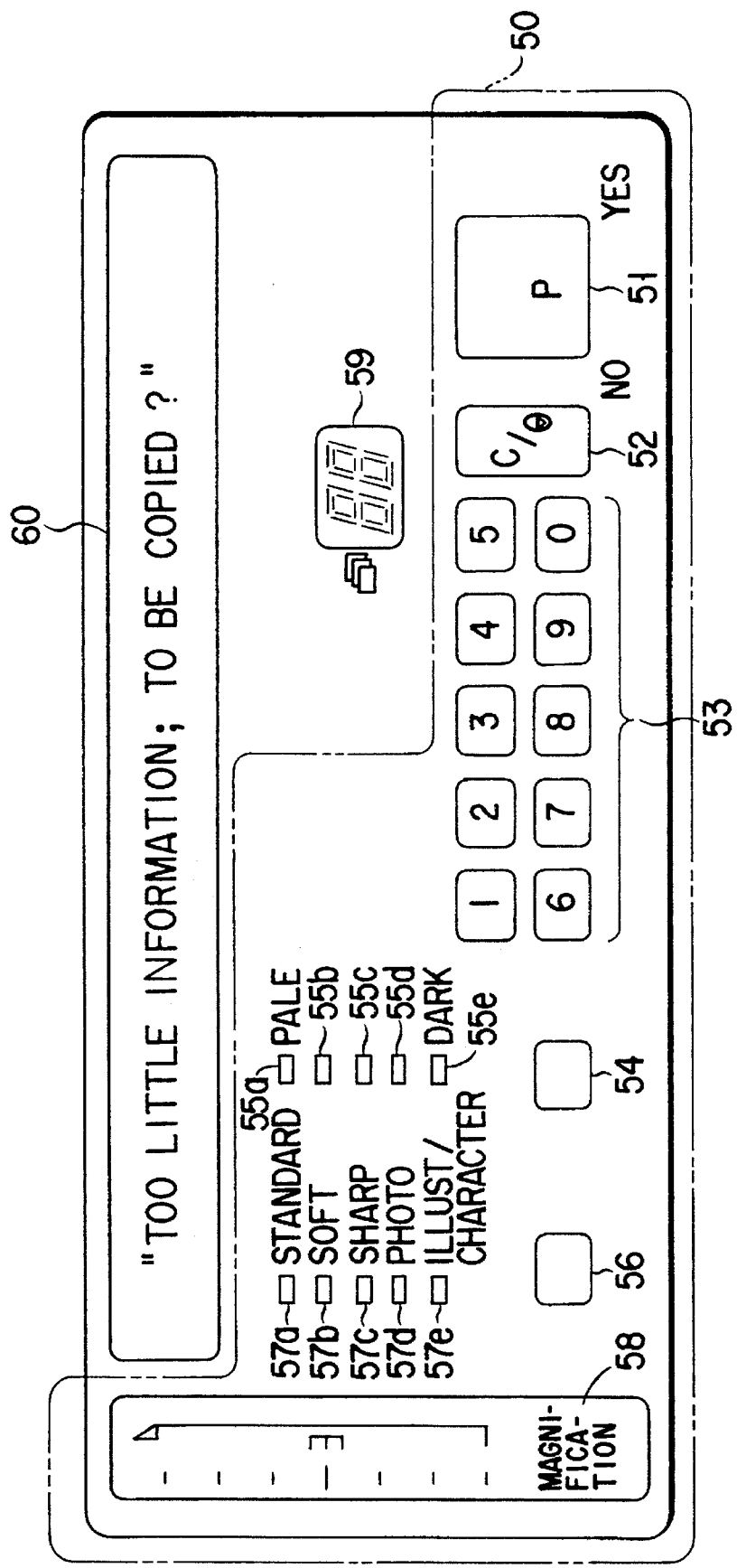
FIG. 4 is an enlarged view of a control panel having a message display section and a key entry section.

The control section 30 is connected with a key entry section 50, a print number indicator 59, and a display section 60. When blank information or similar information is entered in the control section 30, a message "TOO LITTLE INFORMATION; TO BE COPIED?" is displayed on the display section 60, as shown in FIG. 4. Reading this message, an operator depresses a copy start key 51 or a cancel key 52 to execute or interrupt copying operation. The copying operation is automatically interrupted in a predetermined period of time after the display of the message.

The key entry section 50 is provided with copy number setting keys 53, an optical density setting key 54, optical density indicators 55*a*, 55*b*, 55*c*, 55*d* and 55*e*, document type setting key 56, document type indicators 57*a*, 57*b*, 57*c*, 57*d* and 57*e*, and a magnification setting key 58.

The image memory 29 is connected to a filter circuit 21. The circuit 21 has functions to subject signals to filtering and gamma correction. Further, an ink volume converter circuit 23 is connected to the filter circuit 21. The microprocessor 31 of the control section 30 is connected to each of the circuits 21 and 23.

Furthermore, the ink volume converter circuit 23 is connected to the thermal printer head power source 41 in a printing section 40. The thermal printer head 42 and the platen drum 46 face each other with the ink ribbon 43 and the paper sheet 44 between them.

Figures 3, 6:
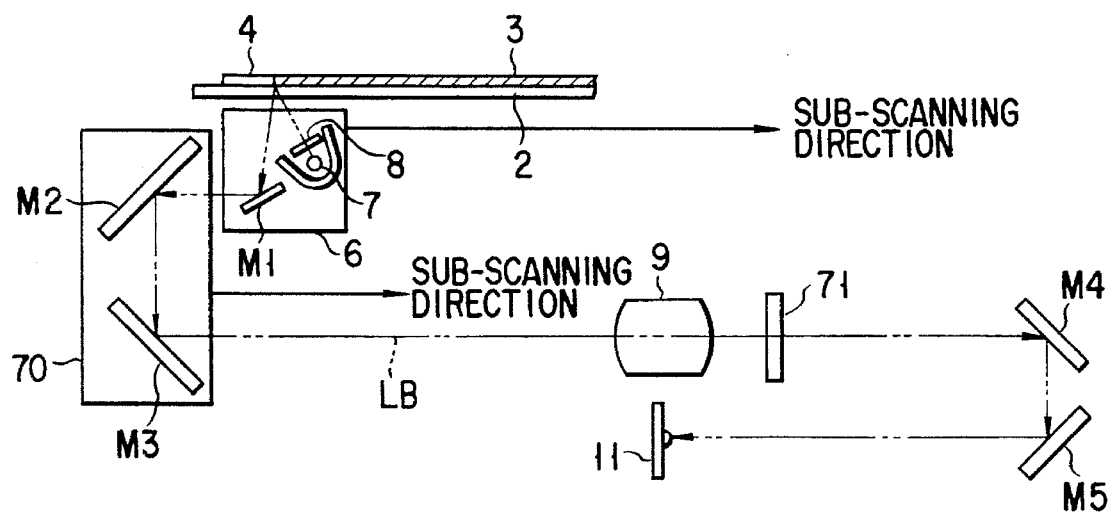
FIG. 3 is a diagram showing an optical system of the digital copying machine.
FIG. 6 is a diagram showing pixels for illustrating the variation rate of an image signal.

Referring now to FIG. 3, an optical system will be described.

A first carriage 6 is disposed right under the document glass 2. The exposure lamp 7, a mirror M1, etc. are mounted on the first carriage 6, while a pair of mirrors M2 and M3 are mounted on a second carriage 70.

The carriages 6 and 70 are arranged so as to be movable in a sub-scanning direction along the document glass 2. Information from each original document 3 is read by scanning both these carriages 6 and 70. The length of an optical path LB between the original document 3 and the lens 9 is fixed to maintain an in-focus state and projection magnification by keeping the scanning speed ratio between the carriages 6 and 70 at 2:1. A filter 71 is interposed between the lens 9 and a mirror M4.

An image signal obtained by converting an analog signal into a digital signal by means of the A/D converter 12 is subjected to normalization (shading correction) by means of the shading correction circuit 13, to compensate for irregular illumination by the exposure lamp 7 and scattering of the sensitivity of the CCD sensor 11.

After undergoing the shading correction, the signal is transferred to the image processing section 20, whereupon it is subjected to filtering and gamma correction by means of the filter circuit 21, and is then converted into an ink volume signal by means of the ink volume converter circuit 23, and transferred to the printing section 40.

In the printing section 40, electric power from the power source 41 to be applied to the thermal printer head 42 is controlled in accordance with the ink volume signal, and hot-melt ink on a film of the ink ribbon 43 is melted by adjusting the heat release value, and is transferred to the image forming medium (paper sheet) 44 in contact with the ribbon 43, thereby forming an image.

Referring now to the flow chart of FIG. 5, a first embodiment will be described in which a plurality of original documents 3 are copied in succession.

The original documents 3 are set on the tray 81 of the ADF 80 (Step S1). The presence of the documents 3 on the tray 81 is detected by means of a sensor (not shown), and the converter section 10, image processing section 20, control section 30, and printing section 40 are individually held on standby according to the result of the detection (Step S2).

When the operator depresses the copy start key 51 of the key entry section 50, image reading operation (pre-scanning) is started in the following steps of procedure (Step S3).

A light beam emitted from the exposure lamp 3 illuminates the original document 3 on the document glass 2. The light beam reflected by the document 3 advances past the mirrors M and the lens 9 to be focused on the CCD sensor 11 of the converter section 10.

Photoelectric transducers, which are arranged on the surface of the CCD sensor 11, serve to convert a document image into an electrical signal. This electrical image signal is amplified by means of an amplifier in the converter section 10, and is converted into a digital signal by means of the A/D converter 12.

Figure 5:
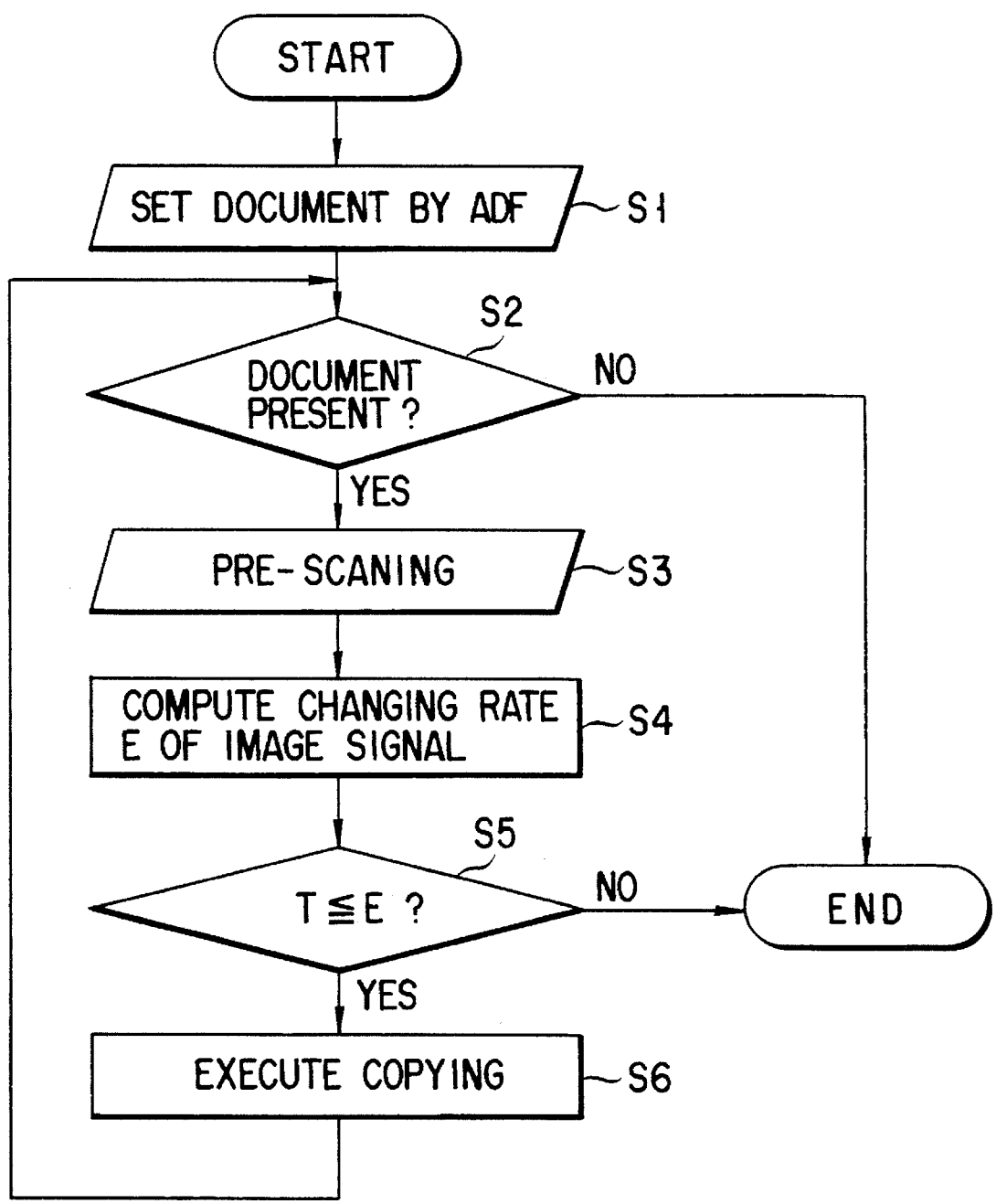
FIG. 5 is a flow chart illustrating an operation for successively copying a number of original documents by means of the ADF function.

Referring now to FIG. 5, the way of processing the read image data will be described in detail.

The signal subjected to the shading correction by means of the shading correction circuit 13 is temporarily stored in the image memory 29.

The image memory 29 is designed for access to the microprocessor 31 of the control section 30. A changing rate E of the image signal is computed by numerical image data processing by means of the microprocessor 31 (Step S4).

As shown in FIG. 6, the variation rate E of the image signal is given as the sum total of absolute values obtained by subtracting the value of a central pixel P1 from the respective values of peripheral pixels P2 to P9 according to the following equation.

$$E = \sum_{j=1}^{N} Ej \quad (1)$$

where EJ is given by $$Ej = \left( \sum_{i=2}^{9} |V_{pi} - V_{Pl}| \right) /8$$

where $V_{pi}$ is the value of a pixel Pi, and N is a number obtained by subtracting the number of peripheral pixels from the total number.

When the document image has a uniform reflective density (or is unifigured), the value of the variation rate E of the image signal represented by equation (1) should be zero. Normally, however, it is not zero due to sampling errors caused during the A/D conversion of the image signal or noise components in the signal system.

A threshold value T is previously stored in the ROM 32. The microprocessor compares the value T with the signal variation rate E, thereby determining whether or not the amount of image information obtained from the original document 3 is relatively large (Step S5).

If the decision is T≤E, copying operation is executed (Step S6), the original document 3 on the glass 2 is discharged onto the tray 89, and another original document 3 is fed onto the glass 2. As long as it is concluded that the original document 3 is on the document supply tray 81, the processes of Step S2 to Step S6 are repeatedly executed. If the absence of the document 3 on the tray 81 is detected, a series of copying processes from image reading to image formation is completed.

If the decision in Step S5 is T>E, on the other hand, the image forming operation is interrupted in response to a command from the microprocessor 31 unless the key 51 or 52 is depressed within a predetermined period of time (e.g., 10 seconds). If T>E is, it is supposed that the reverse side of the original document 3 or a blank sheet of paper is on the surface of the glass 2, so that the operator opens a cover and removes the document from the surface of the glass 2. When the decision is T>E, moreover, the message "TOO LITTLE INFORMATION; TO BE COPIED?" may be displayed on the display section 60, as shown in FIG. 4. In this case, the operator may depress the copy start key 51 to execute copying operation or remove the original document 3 from the glass surface.

Figure 7:
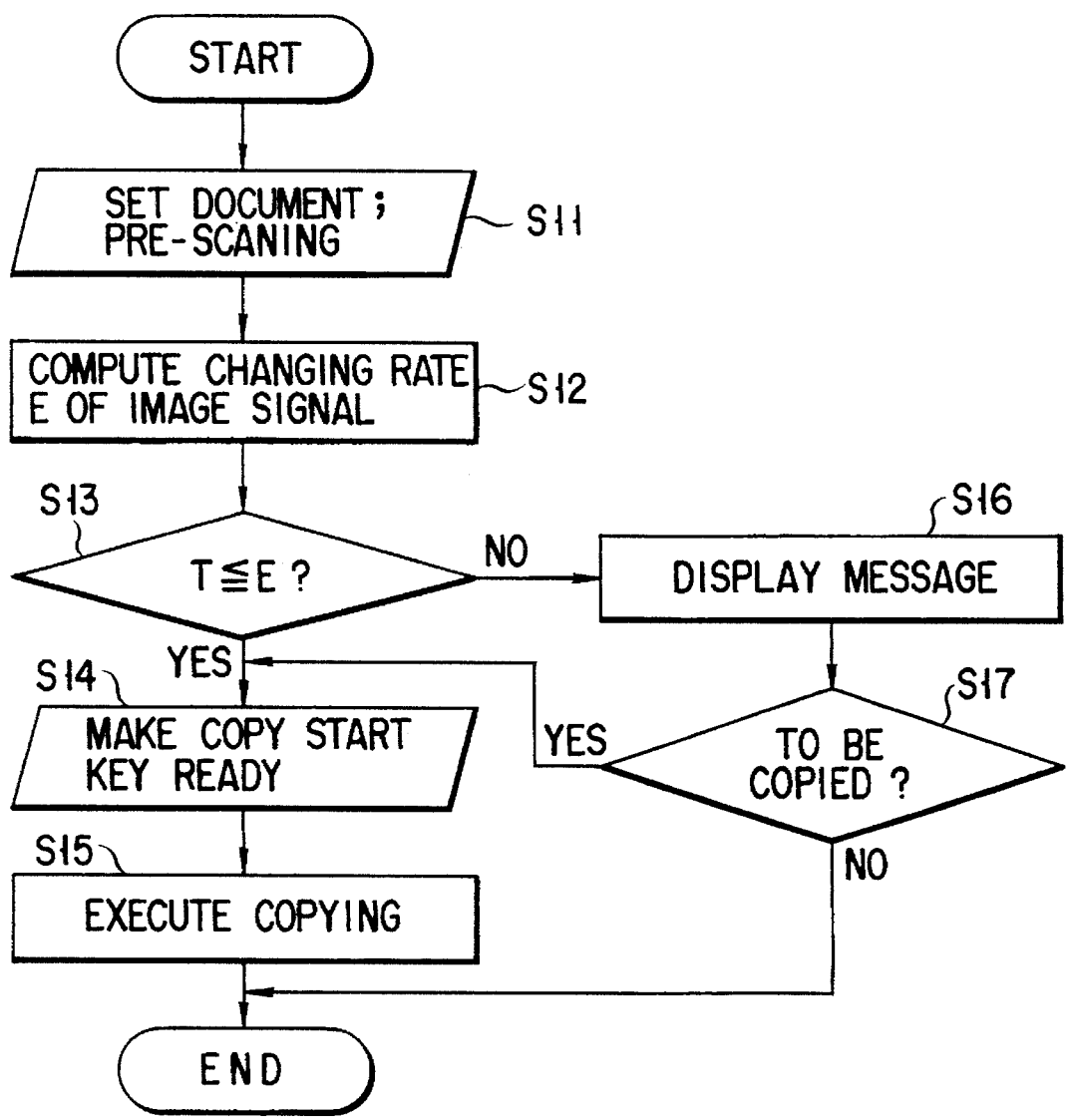
FIG. 7 is a flow chart illustrating an operation for copying a single original document.

Referring now to FIG. 7, a second embodiment of the present invention will be described.

The original document 3 is set on the glass 2, and operator puts the cover on the glass. When the copy start key 51 is depressed, the scanner 6 moves along the glass 2, and the image information from the document 3 is pre-scanned (Step S11).

Based on the read image information, the microprocessor 31 executes data processing, thereby obtaining the changing rate E of the image signal (Step S12).

Since the copy start key 51 is ready for entry (YES) when T≤E is given (Step S14), it is depressed to start copying operation (Step S15).

When T>E is given, the message "TOO LITTLE INFORMATION; TO BE COPIED?" is displayed on the display section 60 (Step S16).

If the operator, reading this message, concludes that the copying operation is unnecessary, he depresses the cancel key 52 of the key entry section 50. If he concludes that the copying operation is necessary, the operator depresses the copy start key 51 of the entry section 50 (Step S17).

The following is a description of a method for setting the threshold value T.

A white reference plate 4 is placed on the document glass 2, and a signal corresponding to image information read from the plate 4 is stored in the image memory 29. The threshold value T is set on the basis of this signal. In this case, a zero reference or a value obtained by adding a suitable amount of image information, such that the image signal changing rate is less than 5%, for example, to the zero reference may be used as the threshold value T.

According to the apparatus of the present invention, the image forming operation in the printing section 40 is interrupted when the cancel key 52 of the key entry section 60 is depressed. When the copy start key 51 is depressed, on the other hand, the image forming operation in the section 40 is started.

The computational procedure, criteria of judgment, judgment procedure are recorded in the ROM 32 of the control section 30.

Although the microprocessor 31 is used for the computation according to the present embodiment, the present invention is not limited to this arrangement, and the computing time may be shortened by using an exclusive arithmetic circuit instead.

Further, the key entry may be delayed for a given period of time by performing a counting operation by means of the microprocessor 31.

According to the present invention, the propriety of the document copying is judged by the amount of information from the original document, and the operator is urged to reconfirm the necessity of copying with use of a relatively simple arrangement, so that useless document image formation or copying errors can be prevented.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image forming apparatus, comprising:

means for scanning an original document in a document scanning direction to output a plurality of image signals, said image signals corresponding to a plurality of portions of the original document and representing image density levels at said portions, respectively;

means for forming an image on a medium on the basis of the image signals received from the scanning means;

means for computing a variation rate E of the image signals from the scanning means, said variation rate E being a variation rate of the image density levels represented by the image signals obtained by subtracting image density level values of nearby pixels from one another;

means for determining that an image forming operation should be interrupted when the variation rate E computed by the computing means is lower than a threshold value T, said threshold value T being a reference value used for determining whether or not the original has an image thereon; and means for informing an operator of a determination made by the determining means.

2. An image forming apparatus according to claim 1, wherein a read image is projected onto a three-by-three (3×3) pixel pattern, and the variation rate E is obtained by the computing means according to the following equation:

$$E = \sum_{j=1}^{N} Ej$$

where Ej is given by $$Ej = \left( \sum_{i=2}^{9} |V_{Pi} - V_{P1}| \right) / 8$$

where $V_{pi}$ is the image density level of a pixel Pi, and Ej is the sum total of absolute values obtained by subtracting an image density level value of a central pixel P1 from respective values of peripheral pixels P2 to P9.

3. An image forming apparatus according to claim 1, further comprising means for feeding a plurality of original documents one after another.

4. An image forming apparatus according to claim 1, further comprising means for interrupting the image forming operation in response to a command from the deciding means when there is no operator's key entry to order the interruption or execution of the image forming operation within a predetermined period of time.

5. An image forming apparatus, comprising:

means, having a light source, for illuminating an original document in a scanning direction;

means, having an optical system, for focusing a reflected light beam from the original document;

first converting means, including a photoelectric transducer, for converting optical image data formed by the focusing means into an electrical analog signal;

second converting means for converting the electrical analog signal obtained by the first converting means into a plurality of digital image signals, said digital image signals corresponding to a plurality of portions of the original document, and representing image density levels at said portions, respectively;

means for forming an image on a medium on the basis of said digital image signals;

means for temporarily storing said digital image signals;

means for computing a variation rate E based on the digital image signals stored in said temporarily storing means, said variation rate E being a variation rate of the image density levels represented by the digital image signals obtained by subtracting image density level values of nearby pixels from one another;

means for deciding whether or not an image forming operation by the image forming means should be interrupted when the variation rate E is lower than a threshold value T, said threshold value T being a reference value used for determining whether or not the original document has an image thereon; and means for causing the image forming means to interrupt the image forming operation when the deciding means decides that the image forming operation should be interrupted.

6. An image forming apparatus according to claim 5, wherein a read image is projected onto a three-by-three (3×3) pixel pattern, and the variation rate E is obtained by the computing means according to the following equation:

$$E = \sum_{j=1}^{N} Ej$$

where Ej is given by $$Ej = \left( \sum_{i=2}^{9} |V_{Pi} - V_{P1}| \right) / 8$$

where $V_{pi}$ is the image density level of a pixel Pi, and Ej is the sum total of absolute values obtained by subtracting an image density level value of a central pixel P1 from the respective values of peripheral pixels P2 to P9.

7. An image forming apparatus according to claim 5, wherein said image forming apparatus includes a display means for displaying a message representing that a variation rate of the image density levels is insufficient.

8. An image forming method, comprising the steps of:

scanning an original document in a scanning direction to optically obtain images corresponding to a plurality of portions of the original document;

converting the images into a plurality of image signals representing image density levels;

computing a variation rate E based on the image signals, said variation rate E being a rate of an image density variation represented by the image signals obtained by subtracting image density level values of nearby pixels from one another;

determining whether or not an image forming operation, by which an image is formed on a medium on the basis of the image signals, should be interrupted when the computed variation rate E is lower than a threshold value T, said threshold value T being a reference value used for determining whether or not the original document has an image thereon; and informing an operator of determination that the image forming operation should be interrupted.

\* \* \* \* \*